April 4, 1967  W. P. ROWLAND  3,312,006
MOTION DISPLAYS
Filed March 11, 1964
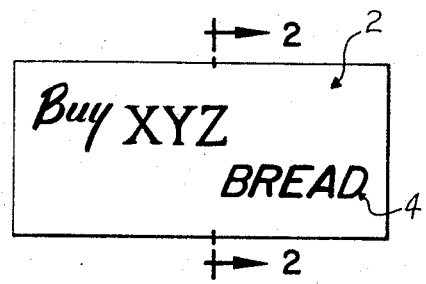
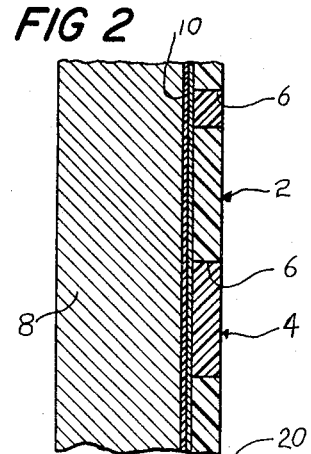
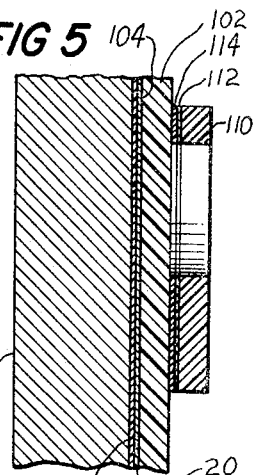
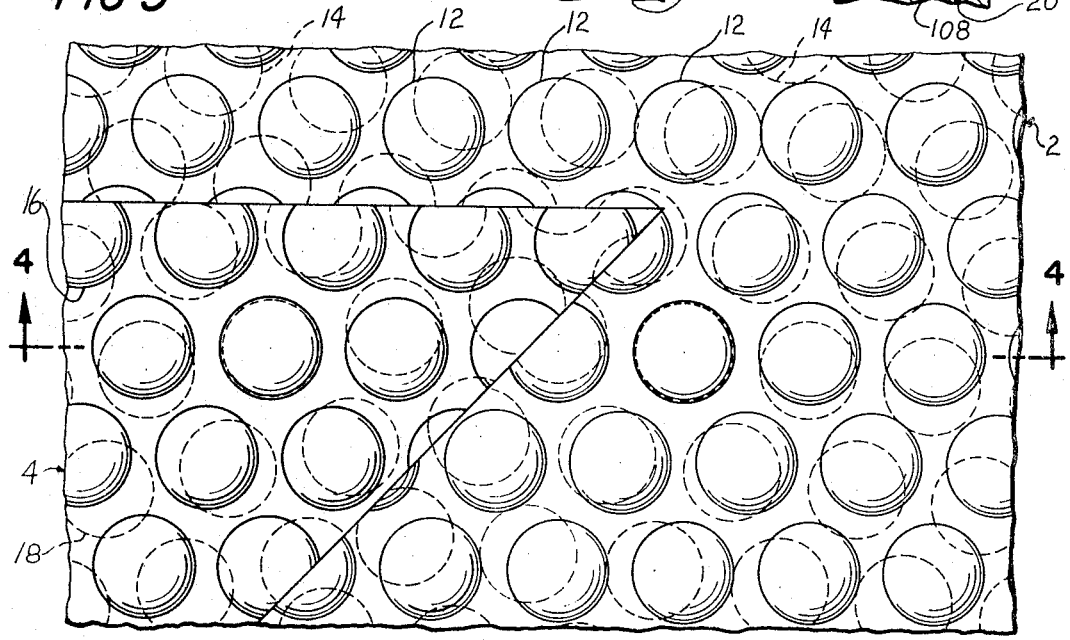
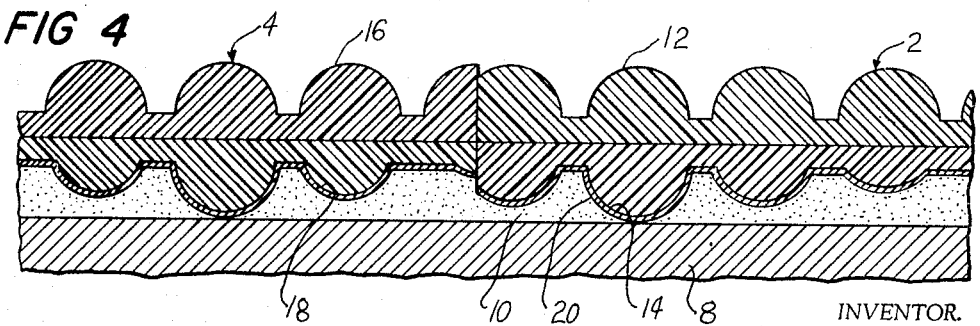
INVENTOR.
WILLIAM P. ROWLAND
BY
Peter L. Costas
ATTORNEY

United States Patent Office 3,312,006
Patented Apr. 4, 1967

3,312,006
MOTION DISPLAYS
William P. Rowland, Southington, Conn., assignor to Rowland Products, Incorporated, Kensington, Conn., a corporation of Connecticut
Filed Mar. 11, 1964, Ser. No. 351,111
15 Claims. (Cl. 40—106.51)

The present invention relates to motion displays utilizing optical effects.

In the marketing of goods and services, it is often highly desirable to provide attention-getting signs and displays, particularly for retail selling. To attract attention, many of these displays employ moving components and flashing lights and may be intricate and relatively expensive as to both first cost and maintenance.

In my copending United States application Ser. No. 261,385, filed Feb. 27, 1963, and entitled, Sheet Materials for Optical Effects and Methods of Making Same, there is described a novel synthetic plastic sheet material which is adapted to provide a wide range of optical effects with light rays falling thereon over a wide angle of incidence. In the copending United States application Ser. No. 286,259 of Hugh Rowland, filed June 7, 1963, and entitled, Multicolored Sheet Material for Optical Effects and Methods of Making Same, there is described an improvement of such sheet material for providing multicolored optical effects.

It is an object of the present invention to provide a novel, attractive and relatively economical motion display which produces apparent motion to an observer in relative motion therewith.

It is also an object to provide an attention-gathering sign producing such apparent motion differentially between the background and indicia.

Other objects and advantages will be readily apparent from the following detailed description and claims and the attached drawing wherein:

FIGURE 1 is a front elevational view of a motion display embodying the present invention;

FIGURE 2 is a fragmentary sectional view to an enlarged scale along the line 2—2 of FIGURE 1 and showing the background and indicia portions to exaggerated thickness and with planar surfaces;

FIGURE 3 is a fragmentary front elevational view to a greatly enlarged scale of the motion display of FIGURE 1;

FIGURE 4 is a fragmentary sectional view along the line 4—4 of FIGURE 3; and

FIGURE 5 is a fragmentary sectional view similar to that of FIGURE 2 and illustrating another embodiment of the present invention.

It has now been found that the foregoing and related objects may be readily attained in a motion display having a display surface with two adjacent surface portions of transparent sheet material, each of which has a body portion of substantial length and width dimensions providing a front surface and being of substantially uniform thickness with a multiplicity of closely spaced discrete formations in a first pattern on the front surface thereof and a multiplicity of closely spaced discrete formations in a second pattern in a parallel plane spaced rearwardly from the front surface thereof. One portion may provide a background for a plurality of indicia portions such as numbers or letters in a sign. The formations of the front surface of each portion phase in and out of registry with the formations of the parallel plane along the planar or horizontal axes of the sheet material of that portion to provide a visual pattern therein to an observer. This phasing of the formations of each portion is provided by displacement of the pattern of formations of the front surface with respect to that of the parallel plane by displacing means selected from the group consisting of a differential in spacing between centers of the formations of the two patterns and an angular offsetting in axes of the two patterns. The displacement of one portion is distinctive from that of the other portion or portions to provide apparent movement of the visual patterns in the different portions at angles to each other.

Although for the present invention the formations may have a variety of forms which provide optical interference effects including dots and the like printed or otherwise formed in or upon the sheet material and various discrete impressions or embossments in the transparent sheet material itself, for optimum attention-gathering effect the front surface of the sheet material has a multiplicity of closely spaced, substantially identical curvilinear lens-like formations thereon in one pattern and the parallel rearward plane has a multiplicity of closely spaced, substantially identical reflective formations in a second pattern. Both the lens-like and the reflective formations extend in axes perpendicular to the front surface thereof and diminish in horizontal cross section along the vertical and horizontal axes of the sheet material from the base portion, i.e., that diminish in cross section outwardly from the body portion, to provide side walls which taper inwardly from the base portion toward the perpendicular axes of the formations. The lens-like formations are curvilinear along both horizontal and vertical axes, i.e., they are curvilinear in cross section in all planes which include the perpendicular axes of the embossments and in all planes which extend through such perpendicular axes. Since the reflective formations phase in and out of axial registry with the lens-like formations along the horizontal axes, varying optical effects are produced by variations in the angle of light rays focused by the lens-like formations onto the tapering side walls of the reflective formations.

This preferred sheet material is described in applicant's aforementioned copending application in complete detail. As pointed out therein, generally the lens-like embossments are each of a configuration which will focus substantially the light rays entering thereinto from various directions, and, accordingly, have a curvilinear convex periphery and horizontal cross section. Although parabolic configurations are the more highly efficient focusing elements, major segments of spheres, preferably approximating hemi-spheres, have also proven highly effective. Since some distortion of the spherical configuration may occur and be tolerated in the present invention, the term "spheroidal" is used herein to encompass both spherical configurations and those configurations deviating somewhat therefrom. Although the embossments on the rear or other surface may be prismatic or conical in configuration, it is far more preferably to employ convex lens-like embossments to obtain considerably greater optical activity and greater reflection as well as retroreflection. When lens-like embossments are employed on the rear surface and a reflective coating is applied thereto, the convex side walls of the rear embossments may taper more gradually to obtain greatest reflection from the center of the lens-like embossments in forming the mirrors. However, either the critical angle for reflection or a reflective coating where such critical angle is not employed, or the combination thereeof, may be utilized to provide reflection of the predominant portion of the light rays impinging upon the tapering side walls of the reflective embossments.

For most applications to avoid unduly large nodes, the embossments must be of relatively small width and closely spaced so as to obtain the repetitive phasing in and out of axial registry within relatively short distances.

Generally, the embossments must be less than about 0.040 inch in width to achieve the desired effect and preferably less than about 0.025 inch. To maintain close spacing and to minimize flats between embossments, a hexagonal pattern of embossments is desirably employed.

To phase the embossments of the rear surface in and out of axial registry with the lens-like embossments of the front surface, the vertical misalignment of the two embossments must progressively vary along any given line or horizontal axis of the sheet material. This may be effected by variation in the relative spacing between centers of adjacent embossments in the two surfaces, by the combination of shape and spacing of the embossments on the two surfaces, or by arranging patterns of similar embossments along different or diverging linear axes of the sheet. However, the spacing between centers of embossments on one surface should not deviate from the spacing between centers of embossments on the other surface by more than about 10 percent, and preferably not more than about 7 percent, in order to maintain relatively large linear length to a single node or complete phase and also to ensure optimum reflection or retroreflection over a wide angle of light incidence. By having greater spacing, on centers, on the rear surface, the pattern appears to be one which stands out of the sheet material whereas greater spacing, on centers, of the embossments in the top surface presents an appearance of concavity or depth. By variation of the differential spacing of the reflective embossments along the two principal horizontal axes, a moiré-like or diffuse pattern can be obtained.

The thickness of the sheet material is largely dependent upon the focal length of the lens-like embossments of the front surface (and of the rear surface when lens-like embossments are employed therein). For purely decorative effect, the total thickness of the sheet material may vary from about one-half to two and one-half times the focal length of the lens-like embossments on the front surface. For achieving a high degree of retroreflectivity with lens-like embossments, a highly reflective coloring agent (or agents) is applied to the major portion of the rear surface, and the thickness of the sheet should be substantially equal to the focal length of the lens-like embossments on the front surface causing the light rays to focus at about the centers of the reflective embossments or to the sum of the focal lengths of the lens-like embossments on the front surface and the lens-like "mirrors" on the rear surface, the former being optimum for maximum retroreflectivity. However, a measure of variation and deviation is tolerable in the present invention since constant axial phasing over the axes of the sheet will result in refracted light rays striking and focusing at various points along the convexly curved surfaces of the rear lens-like projections of each period or phase so as to achieve a significant amount of retroreflection from one or more combinations of embossments in various degrees of axial registration in a single phase or period of the pattern.

Various synthetic plastics may be used for the sheet material of the present invention, including acrylic acid esters such as methyl methacrylate, cellulose acetate, cellulose acetate-butyrate, cellulose propionate, vinyl chloride and copolymers thereof, polystyrene, polycarbonates, cellulose nitrate, polypropylene and polyethylene. Laminates may be desirable to provide more highly weather- and abrasion-resistant surfaces such as by use of very thin surface films of polyethylene terephthalate.

Although it might be possible to emboss the two surfaces of a single sheet by a pair of embossing rollers, there is considerable difficulty in obtaining good flow and formation of the synthetic plastic of the relatively thin sheeting in the engraved recesses of the rollers so that well-formed embossments which are substantially identical across each surface are obtained. Moreover, some difficulty may also be experienced due to surface slippage and flow in maintaining the desired degree of non-registry of the embossing patterns to obtain the desired phasing along the several axes of the sheet material. It has been found that optimum formation of the embossments, and practical control of the non-registry may be obtained by laminating back-to-back two strips of sheet material each embossed on one surface under conditions which produce no significant distortion of the embossments, the lamination being conveniently effected by use of solvent for the sheet material and relatively light pressure applied by rubber pinch rolls. The desired phasing of the embossments can be assured by use of two different embossing rolls having different patterns by reason of embossments which are of different spacing and/or in patterns along different axes. Alternatively, the same embossing roll may be used for both strips and then one of the strips may be stretched or shrunk to a controlled degree which will generally elongate or shrink the web in the spacing between embossments due to the thinner section. Also, the pattern of the embossments on a single roll may be at a predetermined angle to the axis thereof so that the reversal of two strips produced thereby will result in embossed patterns running along differing or diverging axes. By producing a differential in spacing between the embossments greater along one principal horizontal axis than the other, as by controlled shrinkage, stretch or pattern, the moiré-like pattern is readily obtained.

By providing a reflective coating on the reflective formations instead of relying entirely upon the critical angle for reflection, the sheet material may be rendered more highly reflective and even more optically interesting due to accentuation of highlights and due to accentuation of reflection of incident light rays. The phasing in and out of axial alignment of the lens and reflector formations within each node or phase of the pattern produces a multiplicity of areas of dazzling brightness due to reflection of the light in bundles of parallel rays and also effectively ensures a number of lens and reflector combinations to retroreflect light rays over a wide angle of incidence.

When a vacuum metallized or chemically deposited metallic coating is applied to the rear surface, it is highly desirable that it be protected by an outer coating or lacquer, plastic film or other suitable material. For some applications, it may be desirable to overlay the rear surface of the reflectively coated sheet material with a layer of synthetic plastic or other material to provide a flat-surfaced layer which does not interfere with the reflective action of the reflective embossments.

As described in the aforementioned copending application of Hugh Rowland, a sheet material having reflective embossments on the rear surface thereof may provide multicolored, varying optical effects by providing a first coloring agent on a first, substantially identical portion of the embossments and a differential coloring agent on a second, substantially identical portion of the embossments. In this manner, multicolored, varying optical effects are generated by variation in the angle of incidence of light rays focused by said lens-like embossments onto varying points on said first and second colored portions of said reflective embossments.

The term "coloring agent" as used herein refers to lacquers, paints, dyes, metallic films and other materials for providing a color or intensity of color optically distinct from the color of the body of the sheet material, and the term "differential coloring agent" as used herein refers to such lacquers, paints, dyes, metallic films or other materials for providing a color or intensity of color optically distinct from other coloring agents employed and the color of the body of the sheet material.

It will be appreciated that a third or more differentially colored portions may be provided similarly. Generally, the coloring agents should cover the entire rear surface of the sheet material for optimum effect, although for some applications it may be desirable to use portions of the embossments which are free from coloring agent. Generally, the remainder of the sheet material should be substantially transparent or colorless to achieve optimum effectiveness.

The first and differential coloring agents may be applied in various ways to the sheet material such as by printing with suitably patterned plates or rolls, by coating with vaporizable solvent solutions, by vacuum metallizing, by spraying conveniently with suitable masking when both colors are applied thereby, by a roll-type applicator, brush, by wiping, or any other suitable means to provide the coloring agent in a substantially identical location on the embossments. By use of a roller with a compressible absorbent surface for carrying the coloring agent and proper control of pressure, a doughnut-shaped or substantially toroidal band of color can be provided inwardly from the tops of the embossments.

A highly facile and economical method of producing the differential coloring of the sheet material is by first applying a first coloring agent to the tops of the reflective embossments by a roller to provide a substantially concentric crown area thereabout and then applying a differential coloring agent over the entire rear surface of the sheet with the first coloring agent being substantially unaffected thereby and masking its portion of the embossment from the differential coloring agent. This technique is particularly advantageous when a vacuum metallized film is the differential coloring agent. Another technique which has proven advantageous is that of coating the entire surface of the sheet material with a first coloring agent and then lightly abrading the tops of the embossments to remove the first coloring agent therefrom without substantially altering the configuration of the embossments, although some flattening of the tops can be tolerated. The differential coloring agent is then applied to the surface to provide a substantially concentric crown area of the differential coloring agent about the tops of the embossments.

Although the sheet material of the present invention may be used per se whereof sufficient strength both in the planar form and in non-planar form such as revolving and oscillating cylinders and bands, it may be desirable to mount it upon a substrate of various types for added strength and protection or to provide the motion display of the present invention only as one or more portions of a larger display. Where the sheet material is laminated or bonded to a substrate, care should be taken to avoid excessive optical interference with the reflective formations by employment of an air interface or an adhesive which will not injure or distort the reflective formations and their optical effect. For example, when using the preferred embossments upon the rear surface, it is desirable to employ a synthetic plastic material which will fill the spaces about the embossments on the rear surfaces without injuring or distorting the sheet material or its optical properties. In this manner, distortion of the rear embossments may be avoided. However, where the rear surface has not been metallized or coated with highly reflective coloring agents, then substantial destruction of reflective power of the rear embossments should be avoided as by maintaining substantially the air interface by merely bonding the peaks of the embossments to the substrate. Similarly, a protective facing of transparent material may be bonded to or spaced from the peaks of the lens-like embossments of the front surface to preclude dust, dirt and other contamination from the minute, lens-like embossments and greatly reduce their optical properties. In like manner, dots and the like on the front and rear surface may be protected by a superposed layer of material.

Depending upon the dimensioning of the sheet material and the reflective components and the distance of the observer from the motion display as well as the means of effecting the displacement of the front and parallel spaced formations to provide the desired phasing, various visual patterns will be presented to the naked eye of the observer including geometric repeating shapes of various sizes such as the circles which are provided by the illustrated embodiment (not shown). Generally, however, the optical effect of the sheet material will produce a multiplicity of light and dark areas in some form of pattern which will be discernible even at some distance and this can be ensured by proper selection of the components which can be ensured by proper selection of the components which determine the length of the period of the phase.

In making the motion display, two or more portions of optical sheet material are selected so that one portion will produce an apparent movement of the visual pattern at an angle to the apparent movement produced by the portion adjacent thereto.

In one form of the invention, the axes of the two patterns in each of the portions are angularly offset or twisted with respect to each other to provide the displacement of the formation patterns. The angular offsetting results in a visual pattern of alternating bright and dark areas and the size of these areas decreases as the angle of offset is increased. Where the axes of the rear pattern are angularly offset with respect to the axes of the front pattern in a clockwise direction, the light and dark areas therein appear to an observer in motion with respect to the display to be moving in the sheet material in a path approximating 90° clockwise to the direction of relative motion of the observer. Thus, an observer moving from left to right with respect to sheet material wherein the axes of the rear pattern are offset clockwise with respect to the axes of the front pattern, will see the bright and dark areas move downwardly in the sheet material. If the angle of offset is reversed, i.e. the axes of the rear pattern are offset counterclockwise with respect to the axes of the front pattern, the bright and dark areas appear to an observer in motion with respect to the display to be moving in the sheet material in a path approximately 90° counterclockwise to the direction of relative motion of the observer. By providing an angle of offset in one portion opposite to the angle of offset in the other portion, the resulting apparent movements in the two portions of the display are each perpendicular to the relative movement of an observer and are in opposite directions.

In another form of the invention, the spacing between centers of the formations of the two patterns in each of the portions differs to provide the displacement of the formation patterns. If the spacing on centers on the rear surface is greater than that on the front surface, the pattern of apparent formations appears to stand out from the sheet. To an observer moving with respect to the display, the pattern appears to be moving on the sheet material in a path generally parallel but opposite in direction to the path of relative movement of the observer. On the other hand, if the spacing on centers on the rear surface is less than that on the front surface, the pattern of apparent formations appears to be located behind the sheet material. To an observer moving with respect to the display, the pattern appears to be moving in the sheet material in a path generally parallel to and in the direction of the path of relative movement of the observer. By providing greater spacing between centers on the rear surface of the other portion, the resulting apparent movement in the portions of the display are each parallel to the relative movement of an observer and are in directions opposite to each other.

These two means of phasing may be combined to provide one portion wherein the axes of the two patterns are angularly offset and the other portion wherein the centers of the formations of the two patterns are differentially spaced. The apparent movement in one portion is then perpendicular to that in the other portion.

The portions of the motion display may be assembled with the front surface of each aligned to lie in substantially the same surface if desired, in which case they may be mounted in laterally adjacent relationship upon a common backing member or substrate. Alternatively, one portion may be a continuous unbroken sheet conveniently mounted on a backing member for strength and rigidity, and the other portion may be mounted upon the front surface of the first portion by adhesive or other suitable means. Portions of the first portion which extends laterally outwardly of the other portion provide a background for the first portion which may be in the form of indicia.

This effect of apparent motion may be further heightened or embellished when using sheets having a differential in spacing between centers to provide the desired phasing. As previously indicated, such sheets produce an apparent three-dimensional effect and indicia, stripes, borders or other elements may be provided upon the sheet material portion within the margins thereof to provide apparent motion of the element within the portion itself.

As earlier indicated, apparent motion within the display accompanies relative movement between an observer and the display. Thus, the desired effect is achieved when an observer walks past a stationary display or when the display itself moves both by rotation and reciprocation. In one highly effective embodiment, the display includes a substantially continuous band assembly which extends about an axis and which has a display surface of the type described hereinbefore. A small electric motor or similar means is provided for rotating the band assembly about the axis, and the band assembly may be in the form of a cylinder with the axis of rotation coinciding with the major axis of the cylinder. Alternatively, a flexible band assembly may rotate about two spaced parallel axes in the manner of an endless belt, with portions thereof extending substantially rectilinearly between the axes. In another construction, a planar motion display may be reciprocated, preferably at an angle to the vertical so as to effect heightened apparent movement. As will be appreciated, the portions of the motion display may be reciprocated or rotated relative to each other if so desired for special effects.

By use of the present invention, signs and advertising displays of high attention-gathering capabilities are readily obtained at relatively low cost. A wide variety of optical effects can be obtained by the apparent motion phenomena to simulate various effects and heightened by use of the multicolored material to obtain apparent bubbling or water flow. The designer has available a very broad range of effects and degrees of effect to enable extensive versatility in planning motion displays.

Turning now in detail to the attached drawing, FIGURES 1–4 illustrate a motion display sign embodying the present invention as used for advertising purposes. The face of the display sign includes a first portion of transparent synthetic plastic sheet material, generally indicated by the numeral 2, which provides a background for a plurality of indicia portions of transparent synthetic plastic sheet material, generally designated by the numeral 4. The indicia portions 4 comprises the letters "Buy XYZ BREAD" and are of a color which contrasts or differs from that of the first portion 2 for increased visual impact. As seen in the partially diagrammatic FIGURE 2 which shows the portions 2, 4 as planar and enlarged in thickness, the first or background portion 2 is fabricated with recesses or openings 6 therein configured and dimensioned to receive snugly the indicia portions 4. The front surfaces of portions 2 and 4 thus lie in susbtantial alignment in a common surface or plane and are mounted upon a relatively rigid backing member 8 by a suitable adhesive 10.

Referring in detail to FIGURES 3 and 4, therein is fragmentarily illustrated to a greatly enlarged scale a portion of the motion display about the upper vertex of the letter "Z." The first or background portion 2 is seen to have a multiplicity of discrete curvilinear lens-like embossments 12 arranged in a pattern on the front surface thereof and a multiplicity of discrete curvilinear lens-like embossments 14 on the rear surface thereof and arranged in a similar pattern. The axis of the pattern of the embossments 14 on the rear surface is seen to be angularly offset or twisted in a clockwise direction with respect to the axis of the pattern of the embossments 12 on the front surface. Similarly, the indicia 4 have a pattern of curvilinear embossments 16 on the front surface thereof and a pattern of embossments 18 on the rear surface thereof. In the indicia portions 4, however, the axis of the embossments 18 in the rear pattern is angularly offset in a counterclockwise direction with respect to the axis of hte embossments 16 of the front pattern. In the illustrated embodiment, the embossments 12, 14, 16 and 18 are all of generally spheroidal configuration.

As seen in FIGURE 4, each of the portions 2, 4 is formed of two strips of embossed plastic sheet material laminated in back-to-back relationship. The rear surfaces of the composite or laminated portions 2, 4 thus formed are provided with a reflective coating 20 to increase the reflectivity of the rear surface for heightening the attention-gathering power of the display, conveniently by vacuum metallizing. The adhesive 10 which adheres the portions 2 and 4 to the backing member 8 is visually isolated by the reflective coating 20 from an observer of the display and should be selected so as to avoid appreciable effect upon the reflective coating.

Thus, in the illustrated display sign, the light and dark areas of the visual pattern in the first or background portion 2 will appear to be moving downwardly and the light and dark areas of the visual pattern in indicia portions 4 will appear to be moving upwardly to an observer moving from left to right with respect to the sign. The opposing apparent movement in the portions 2, 4 accentuates the apparent movement within either portion and provides an extremely effective attention-gathering device. Thus, the heightened downward apparent movement of the visual pattern in the background portion 2 creates an illusion that the indicia portions 4 are moving upwardly with respect to the background.

Turning now to FIGURE 5, therein partially diagrammatically illustrated is another construction for a motion display utilizing sheet material of the type employed in the embodiment of FIGURES 1–4. In this embodiment, the background portion 102 has no recesses or openings therein and is a continuous sheet of transparent material with a reflective coating 104 on the rear surface thereof and is bonded to a rigid backing member 106 by a suitable adhesive 108. The indicia portion 110 has a reflective coating 112 on the rear surface thereof and is mounted upon the front surface of the background portion 102 by a suitable adhesive 114. In this manner, assembly may be effected more easily, particularly where the indicia portions 110 assume complex shapes and are numerous. As in FIGURE 2, the portions 102, 110 have been shown as having planar surfaces for convenience of illustration although embossed as in FIGURES 3 and 4.

Thus, it can be seen that the present invention provides a novel, attractive and highly effective attention-gathering motion display which is relatively economical both as to production and maintenance costs. The display may be readily and economically assembled and utilizes optical interference effects to provide apparent motion and thus obviate the necessity for moving parts in the display surface, and it may employ retroreflection for enhanced effect. These optical effects may also be coupled with differential coloring to provide a wide range of highly attractive designs for effectively attracting attention.

Having thus described the invention, I claim:

1. A motion display having a display surface with adjacent surface portions of synthetic plastic material for producing optical effects, each of said surface portions having a body portion of substantial length and width dimensions providing front and rear surfaces, said material being of substantially uniform thickness and having a bossments on the front surface thereof, each lens-like multiplicity of closely spaced curvilinear lens-like embossment projecting on an axis perpendicular to said front and rear surfaces, said material also having a multiplicity of closely spaced reflective embossments on said rear surface, each reflective embossment projecting on an axis perpendicular to said fron and rear surfaces, each lens-like and reflective embossment diminishing in cross-section along its perpendicular axis outwardly from said body portion to provide side walls tapering inwardly in several planes converging from said body portion toward its perpendicular axis, each lens-like embossment being curvilinear in cross section in all planes each of which includes its perpendicular axis and in all planes which extend both normal to and through each perpendicular axis, said reflective embossments phasing in and out of axial registry with said lens-like embossments in at least one direction to provide a varying visual pattern due to variation in the angle of incidence of light rays focused by said lens-like embossments of said front surface onto the tapering side walls of the reflective embossments of said rear surface, the center-to-center spacing of said lens-like embossments deviating not more than 10 percent from the center-to-center spacing of said reflective embossments, said close spacing of said lens-like and reflective embossments precluding any bands of flat surface therebetween in any direction, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof, the phasing of the reflective embossments into and out of axial alignment with the lens-like embossments employing displacement of the patterns of the embossments on the front and rear surfaces, the mode of displacement in one surface portion being distinctive from that in the other surface portion to provide apparent movement of said visual patterns in the two adjacent surface portions at angles to each other.

2. The motion display of claim 1 wherein said embossments on said front and rear surfaces in each of said adjacent surface portions are arranged in patterns with at least two axes and wherein the axes of the patterns of the embossments in the front and rear surfaces in each of said adjacent portions are angularly offset with respect to each other to provide said displacement of embossments patterns, the angle of offset in one of said adjacent portions being opposite to the angle of offset in the other of said adjacent portions.

3. The motion display of claim 1 wherein said embossments on said front and rear surfaces in each of said adjacent surface portions are arranged in patterns with at least two axes and wherein the spacing between centers of the formations of the patterns of embossments in the front and rear surfaces in each of said portions adjacent differs to provide said displacement of embossments patterns, the differential in spacing between the two patterns in one of said portions being opposite to the differential in spacing between the patterns of embossments in the front and rear surfaces in the other of said portions.

4. The motion display of claim 1 wherein said embossments on said front and rear surfaces in each of said adjacent surface portions are arranged in patterns with at least two axes and wherein the axes of the patterns of embossments in the front and rear surfaces in one of said adjacent portions are angularly offset with respect to each other to provide displacement of embossments patterns, and wherein the spacing between centers of the embossments of the patterns of embossments on the front and rear surfaces in the other of said adjacent portions differs to provide displacement of embossment patterns.

5. The motion display of claim 1 wherein the front surfaces of said two adjacent surface portions are aligned.

6. The motion display of claim 1 wherein one of said two adjacent surface portions is mounted upon the front surface of the other of said adjacent surface portions.

7. The motion display of claim 1 wherein said reflective embossments have a reflective coating thereon.

8. The motion display of claim 1 wherein said lens-like embossments are substantially parabolic in cross section in all planes which include said perpendicular axes.

9. The motion display of claim 1 wherein said reflective embossments are of curvilinear lens-like configuration similar to the configuration of the lens-like embossments of said front surface.

10. A motion display having a display surface with adjacent surface portions of synthetic plastic material for producing optical effects, each of said surface portions having a body portion of substantial length and width dimensions providing front and rear surfaces, said material being of substantially uniform thickness and having a multiplicity of closely spaced curvilinear lens-like embossments on the front surface thereof, each lens-like embossment projecting on an axis perpendicular to said front and rear surfaces, said material also having a multiplicity of closely spaced reflective embossments on said rear surface, each reflective embossment projecting on an axis perpendicular to said front and rear surfaces, each lens-like and reflective embossment diminishing in cross-section along its perpendicular axis outwardly from said body portion to provide side walls tapering inwardly in several planes converging from said body portion toward its perpendicular axis, each lens-like embossment being curvilinear in cross section in all planes each of which includes its perpendicular axis and in all planes which extend both normal to and through each perpendicular axis, said reflective embossments phasing in and out of axial registry with said lens-like embossments in at least one direction to provide a varying visual pattern due to variation in the angle of incidence of light rays focused by said lens-like embossments of said front surface onto the tapering side walls of the reflective embossments of said rear surface, the center-to-center spacing of said lens-like embossments deviating not more than 10 percent from the center-to-center spacing of said reflective embossments, said close spacing of said lens-like and reflective embossments precluding any bands of flat surface therebetween in any direction, said side walls of said reflective embossments tapering at an angle greater than the critical angle for said synthetic plastic to reflect the predominant portion of light rays impinging thereon, the distance between the outer surface of the embossments of the front surface and the outer surface of the embossments of the rear surface being substantially equal to the focal length of said lens-like embossments of said front surface to effect substantial focusing of light rays passing through said lens-like embossments onto the side walls of said reflective embossments for substantial reflection thereof, the phasing of the reflective embossments into and out of axial alignment with the lens-like embossments employing displacement of the patterns of the embossments on the front and rear surfaces, the mode of displacement in one surface portion being distinctive from that in the other surface portion to provide apparent movement of said visual patterns in the two adjacent surface portions at angles to each other, said rear surfaces of said adjacent portions having a reflective coating thereon.

11. A motion display comprising a substantially continuous band assembly encircling an axis and having a display surface with adjacent surface portions of synthetic plastic material for producing optical effects, each of said surface portions having a body portion of substantial length and width dimensions providing front and rear surfaces, said material being of substantially uniform thickness and having a multiplicity of closely spaced curvilinear lens-like embossments on the front surface thereof, each lens-like embossment projecting on an axis perpendicular to said front and rear surfaces, said material also having a multiplicity of closely spaced reflective embossments on said rear surface, each reflective embossment projecting on an axis perpendicular to said front and rear surfaces, each lens-like and reflective embossment diminishing in cross section along its perpendicular axis outwardly from said body portion to provide side walls tapering inwardly in several planes converging from said body portion toward its perpendicular axis, each lens-like embossment being curvilinear in cross section in all planes each of which includes its perpendicular axis and in all planes which extend both normal to and through each perpendicular axis, said reflective embossments phasing in and out of axial registry with said lens-like embossments in at least one direction to provide a varying visual pattern due to variation in the angle of incidence of light rays focused by said lens-like embossments of said front surface onto the tapering side walls of the reflective embossments of said rear surface, the center-to-center spacing of said lens-like embossments deviating not more than 10 percent from the center-to-center spacing of said reflective embossments, said close spacing of said lens-like and reflective embossments precluding any bands of flat surface therebetween in any direction, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof, the phasing of the reflective embossments into and out of axial alignment with the lens-like embossments employing displacement of the patterns of the embossments on the front and rear surfaces, the mode of displacement in one surface portion being distinctive from that in the other surface portion to provide apparent movement of said visual patterns in the two adjacent surface portions at angles to each other; and means for rotating said band assembly about said axis.

12. The motion display of claim 11 wherein said band assembly is substantially in the form of a cylinder, and wherein said axis coincides with the major axis of said cylinder.

13. The motion display of claim 11 wherein said rear surfaces of said adjacent surface portions each has a reflective coating thereon.

14. A sign having a display surface with a background portion and a plurality of indicia portions providing adjacent surface portions yielding differential optical effects as a result of apparent movement of visual patterns in said indicia portions in a direction at an angle to apparent movement of visual patterns in said background portion, each of said surface portions having a body portion of substantial length and width dimensions providing front and rear surfaces, said material being of substantially uniform thickness and having a multiplicity of closely spaced curvilinear lens-like embossments on the front surface thereof, each lens-like embossment projecting on an axis perpendicular to said front and rear surfaces, said material also having a multiplicity of closely spaced reflective embossments on said rear surface, each reflective embossment projecting on an axis perpendicular to said front and rear surfaces, each lens-like and reflective embossment diminishing in cross section along its perpendicular axis outwardly from said body portion to provide side walls tapering inwardly in several planes converging from said body portion toward its perpendicular axis, each lens-like embossment being curvilinear in cross section in all planes each of which includes its perpendicular axis and in all planes which extend both normal to and through each perpendicular axis, said reflective embossments phasing in and out of axial registry with said lens-like embossments in at least one direction to provide a varying visual pattern due to variation in the angle of incidence of light rays focused by said lens-like embossments of said front surface onto the tapering side walls of the reflective embossments of said rear surface, the center-to-center spacing of said lens-like embossments deviating not more than 10 percent from the center-to-center spacing of said reflective embossments, said close spacing of said lens-like and reflective embossments precluding any bands of flat surface therebetween in any direction, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof, the phasing of the reflective embossments into and out of axial alignment with the lens-like embossments employing displacement of the patterns of the embossments on the front and rear surfaces, the mode of displacement in said indicia portions being distinctive from that in said background portion to provide apparent movement of said visual patterns in said indicia portions at an angle to apparent movement of the visual pattern in said background portion.

15. The sign of claim 14 wherein said rear surfaces of said background and indicia portions have a reflective coating thereon and wherein said reflective embossments are similar in configuration to said lens-like embossments, said lens-like and reflective embossments being substantially parabolic in cross section in all planes which include said perpendicular axes.

References Cited by the Examiner
UNITED STATES PATENTS

| | | | |
|---|---|---|---|
| 1,523,384 | 1/1925 | Arbuckle | 40—136 |
| 2,231,139 | 2/1941 | Reininger | 88—82 X |
| 2,330,097 | 9/1943 | Waters | 88—82 |
| 2,351,034 | 6/1944 | Gabor | 88—1 |
| 2,371,172 | 3/1945 | Hatchner | 40—132 X |
| 2,700,919 | 2/1955 | Boone | 40—136 X |
| 2,951,419 | 9/1960 | Lemelson | 88—82 |

EUGENE R. CAPOZIO, *Primary Examiner.*

H. F. ROSS, *Examiner.*